Patented Feb. 23, 1954

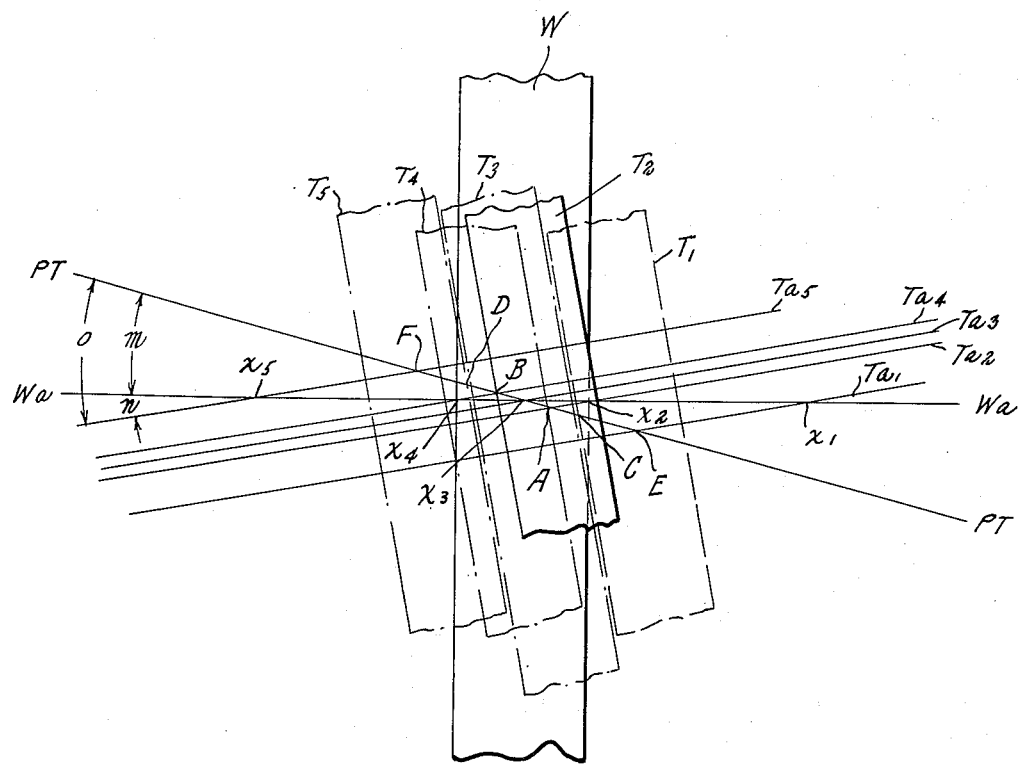

2,669,905

UNITED STATES PATENT OFFICE 2,669,905

FULL TOOL GEAR FINISHING METHOD

Edward W. Miller, Springfield, Vt., assignor to The Fellows Gear Shaper Company, Springfield, Vt., a corporation of Vermont Application August 15, 1947, Serial No. 768,881

7 Claims. (Cl. 90—1.6)

The present invention relates to the art of finishing gears by means of shaving cutters and analogous tools which are like gears in that they are provided with teeth conjugate to the teeth of the gears which are finished by them. Shaving cutters, although similar to gears in the respect noted, yet differ from gears in being made of alloy steel suitable for metal cutting tools and in having grooves or gashes in the sides of their teeth, the intersections of which with the tooth faces provide cutting edges. Analogous tools, within the meaning of the term "analogous" precedently used, include lapping and burnishing tools, which also are made of gear form conjugate to the gears to be finished.

More particularly the invention is concerned with that phase of the gear finishing art which involves placing the tool and work gear in crossed axis or skewed meshing arrangement with their meshing teeth in pressure contact, rotating either the tool or the gear by applied force, and effecting relative travel between the tool and work gear in a path which is also askew with respect to the work gear axis. Due to the inclination of the path of travel to the axis of the work gear, the contact area between the intermeshing teeth is shifted progressively lengthwise along the teeth of the tool as well as along the teeth of the work; thereby distributing the effects of wear on the tool and increasing its useful life. I have coined as a descriptive title for this procedure the expression "full tool method" because under some conditions the full face width of the tools, and under all conditions a much larger portion of the face width than is the case when the path of travel is parallel to the work gear axis, is utilized in the finishing of gears.

I have discovered that there are critical relationships and limiting ranges in the angles between the axes of tool and work gear and between the gear axis and the path of reciprocative travel, and in the speed and distance ratios of such travel to the rotation of the work gear, within, and only within, which superior results are obtained in accuracy of tooth form produced in the work, quality of surface finish, and rapidity of output of finished gears. The present invention consists in methods by which my discoveries are put to beneficial use. The principles of the invention are fully described in the following specification with reference to an illustrative drawing, in which—

The single figure is a diagram showing the operative relationship between a tool and work gear in five of the different positions which these elements may occupy with respect to one another in the course of a working stroke of maximum length.

In this drawing, T represents a finishing tool and W a work gear in mesh with the tool. It may be understood without specific illustration that the tool has teeth of gear tooth formation meshing with the teeth of the gear, and that the tool may be a shaving cutter of well known character or one of the analogous gear finishing tools previously referred to. In accordance with the common practice in this art, the tool and work gear are mounted on rotatable spindles in mesh with one another and with the intermeshing teeth in pressure contact; and one of the spindles, (it is immaterial which one), is positively rotated.

$Ta$ represents the axis of the tool, $Wa$ the axis of the work, and X the crossing point of these axes, which are skewed or inclined to one another at an oblique angle. It is assumed for the purpose of this description that the tool is displaced bodily forward and back in a straight path represented by the line PT, which is inclined at an oblique angle to both axes and, in accordance with that assumption, the tool and its axis have been shown in five different positions distinguished by the exponents 1, 2, 3, 4 and 5.

As the axes $Ta$ and $Wa$ are not in the same plane, they do not actually intersect; hence the term "crossing point" as used in this specification means the intersection of the perpendicular projections of the two axes on the plane of the diagram. In other words, the crossing point is the point on each axis which is intersected by the line perpendicular to both axes, (the common perpendicular). The points on the two axes intersected by the common perpendicular are the points where the axes are nearest together; and the portions of the tool and work gear through which the common perpendicular passes are the points of closest contact where the heaviest cutting (in the shaving operation) and complete finishing action occur.

The before named assumption, (that the tool is reciprocated while the work gear remains in the same location), is not a limiting factor of the invention, for the work may be displaced bodily while the tool remains in the same location, or both may be displaced bodily in a manner to effect a relative displacement in a path oblique to the work gear axis equivalent to that here described.

The angle between the perpendicular projections of the axes on the plane of the diagram is designated $n$, this angle being called the crossed axis angle. The angle between the path of travel PT and the work gear axis is designated $m$, and that between the path and the tool axis is designated $o$, the latter angle being the arithmetical sum of the angles $m$ and $n$.

In order to permit full mesh of the work gear and tool teeth on crossed axes when the work piece is a spur gear, the tool is provided with helical teeth of helix angle equal to the angle $n$. Or, if the workpiece is a helical gear, the tool may be either of spur gear form or of helical form depending on the helix angle and hand of the gear teeth. These angles $n$, $m$ and $o$ may have various values within critical limits as to magnitudes and ratio.

The positions $T^1$ and $T^5$ of the tool shown in the drawing represent the extreme positions to which the tool can be feasibly brought without carrying its teeth out of meth with the teeth of the work. The lines $Ta^1$ and $Ta^5$ show the corresponding positions of the tool axis; and $X^1$ and $X^5$ show the crossing points of the tool axis with the work gear axis $Wa$. $T^2$ shows the position of the tool when the crossing point $X^2$ of the axes coincides with one face of the work gear, and $T^4$ shows the position of the tool when the crossing point $X^4$ coincides with the opposite face of the gear. $T^3$ is the position of the tool and $X^3$ is the crossing point when the tool is in mid stroke. The lines $Ta^2$, $Ta^4$ and $Ta^3$ indicate the positions of the axis $Ta$ when the tool is in the last three designated positions.

In passing forward and back between the positions $T^2$ and $T^4$, the tool travels a distance along the path PT equal to that between the points A and B where the axis lines $Ta^2$ and $Ta^4$ cross the line PT. This is sufficient to accomplish the full depth of cutting across the entire face of the gear, but a certain amount of over travel is necessary to improve the finish. It has been found that if the work is removed when the crossing point is either at $X^2$ or $X^4$, pressure marks are left in the work which impair the finish, and enough over travel is necessary to relieve the pressure between the mating teeth while the finishing action continues, in order to obliterate such pressure marks.

When this method is practised with the aid of supporting means operable to effect separation between the tool and work in a direction perpendicular to their axes, or nearly so, to permit changing of the work, only enough over travel need be provided for to relieve the pressure. But in circumstances where there is no provision for such separation, additional over travel is necessary to afford sufficient backlash between the tool and gear to permit removal of the finished gear and substitution of a new work piece. Due to the inclination between the path of travel and the work gear axis, the center distance between tool and work is increased with progressive over travel, which provides the backlash necessary for this purpose. But, as previously indicated, the over travel should not be continued far enough to bring the tool entirely out of mesh with the work. Hence the tool is arrested while it overlaps the work sufficiently to insure proper mesh with a substituted work piece at the end of its final stroke of reciprocation. And also, during the finishing operation, it is reversed in direction of travel while there is such an overlap.

It may be assumed for present purposes that the tool positions $T^1$ and $T^5$ afford the minimum feasible overlap at the positions of reversal and of stoppage for changing the work. The projections of such overlap on the line PT are shown at C and D, respectively. Less over travel than that shown may afford sufficient backlash to permit changing the work, in some conditions. That here indicated is the greatest feasible over travel.

In passing forward and back between the positions $T^1$ and $T^5$ the tool travels along the path PT a distance equal to that between the points E and F where the corresponding positions $Ta^1$ and $Ta^5$ of the tool axis cross the path PT.

In practical operation machine parts are provided for holding the tool and work piece, rotating one of them by applied force, and effecting travel of the one which is displaceable bodily. Such travel or displacement is called the feed. The ratio of this feeding displacement to the rotation of the work piece is important, and I have found that satisfactory finishing results cannot be obtained in gear shaving if the feed is greater than thirty-five thousandths (.035) of an inch per revolution of the work piece. This is the largest permissible ratio, but the best results have been obtained with much lower rates of feed, for instance approximately sixteen thousandths (.016) of an inch per revolution. With a feed of this order of magnitude and a definitely limited range of values for the angles $m$ and $n$, I have been able to produce finished gears with highly accurate tooth profiles and exceptionally fine surface finish, and with a high rate of production.

Rapid production of finished gears is of the utmost importance commercially as an offset to cost factors in determining prices. Hence the ratio of time consumed in cutting travel to the time of total travel of the cutter must be as large as possible.

I have found that these desired results are obtained when the ratio of cutting travel represented by the distance A–B is one fifth or more of the total travel represented by the distance E–F and the tangent of the angle $m$ is less than four times the tangent of the angle $n$. Superior and surprising results have been obtained with a value of 25° for the angle $m$ and 7° for the angle $n$. These specific angles are not limiting, but I have found that the angle $n$ should not be more than 15° and may be much smaller than that, while the angle $m$ may not be more than 35° and is preferably considerably smaller. Whatever may be the specific values of these angles in any case, the feed ratio may not be more than thirty-five thousandths of an inch for each revolution of the work and is preferably considerably smaller.

The ratio between the face widths of the tool and work shown in the accompanying drawing is not a limiting factor, for the tool may be relatively wider or narrower than as shown. Although equal over travel in both directions is indicated in the drawing, such is not a necessary condition of the invention, for the over travel at the end of the stroke opposite to that at which displacement is arrested when the work is changed need be no more than the minimum needed for eliminating pressure marks in any case.

I claim:

1. The method of finishing a gear which consists in meshing a gear shaped shaving cutter in pressure contact with a work gear in an oblique crossed axis arrangement of which the value of the acute angle is within 15°, rotating the cutter and gear, and displacing the cutter translatively in a path lying at an angle within 35° with the axis of the gear at a rate of speed less than thirty-five thousandths of an inch per revolution of the gear.

2. The method of finishing a gear which consists in meshing a gear shaped shaving cutter in pressure contact with a work gear in an oblique crossed axis arrangement of which the value of the acute angle is less than 15°, rotating one of said elements by applied force, and effecting relative displacement bodily between the tool and work gear at a feeding speed in the neighborhood of sixteen thousandths of an inch per revolution of the gear in a path inclined to the axis of the work gear at an angle in the neighborhood of 25°.

3. The method of finishing a gear which consists in meshing a gear shaped shaving cutter in pressure contact with a work gear in an oblique crossed axis arrangement, of which the value of the acute angle between the crossed axes is less than 15°, rotating one of said elements by applied force, effecting relative displacement bodily between the cutter and work gear at a feeding speed in the order of sixteen thousands of an inch per revolution of the gear in a path inclined to the axis of the gear at an angle of about 25° and carrying on the relative displacement in successively opposite directions sufficiently far to relieve the pressure contact between the meshing teeth.

4. The method of finishing a gear by means of intermeshing pressure contact with the teeth of a gear shaped tool, which comprises meshing the tool and work gear with their axes crossing at an angle of not more than 15°, rotating one of said elements by applied force and thereby transmitting rotation to the other through their meshing teeth, effecting relative translative displacement between the tool and gear in successively opposite directions in a path inclined to the axis of the gear at an angle not greater than 35°, and causing such relative displacement to extend through a position wherein the crossing point of the axis is in the plane of one end face of the gear, and through a position wherein such crossing point is in the plane of the opposite end face of the gear, to a position wherein a short overlap exists between the ends of the meshing teeth, the distance between the first and third of the above named positions being less than five times the distance between the first and second named positions.

5. The method of finishing gears in which a gear shaped tool is meshed in pressure contact with a work gear and is disposed in crossed axis relation thereto, which comprises effecting relative translative displacement between the tool and gear in a path inclined to the axis of the gear and the tool and establishing the acute angle of inclination of such path with the axis of the gear at a value such that its tangent is less than four times the magnitude of the tangent of the acute angle between the crossed axes.

6. The method of gear finishing set forth in claim 5 in which the acute angle of inclination of the path of relative translative displacement between the tool and gear with the axis of the gear is greater than 15° and not more than 35° and the acute angle between the crossed axes is not more than 15°.

7. The method of finishing a gear which consists in meshing a finishing tool with a gear with their axes crossing one another obliquely and the acute angle between such axes of a value within 15°, causing the tool and work gear to be rotated in pressure contact one with the other, translating one of them bodily with respect to the other in a path which is inclined to the axis of the work at an angle greater than 15° and less than 35° and maintaining the relative speeds of rotation and translation such that the translative travel is less than thirty-five thousandths of an inch per revolution of the gear.

EDWARD W. MILLER.

References Cited in the file of this patent

UNITED STATES PATENTS

| Number | Name | Date |
|---|---|---|
| 2,126,178 | Drummond | Aug. 9, 1938 |
| 2,291,537 | Drummond | July 28, 1942 |
| 2,484,482 | Austin | Oct. 11, 1949 |
| 2,585,261 | Mentley | Feb. 12, 1952 |
| 2,617,331 | Austin | Nov. 11, 1952 |

FOREIGN PATENTS

| Number | Country | Date |
|---|---|---|
| 480,247 | Great Britain | Feb. 14, 1938 |